Aug. 30, 1966
J. ALVARADO ETAL
3,269,410
STOPCOCK OR FLOW VALVE
Filed Oct. 21, 1964
3 Sheets-Sheet 1
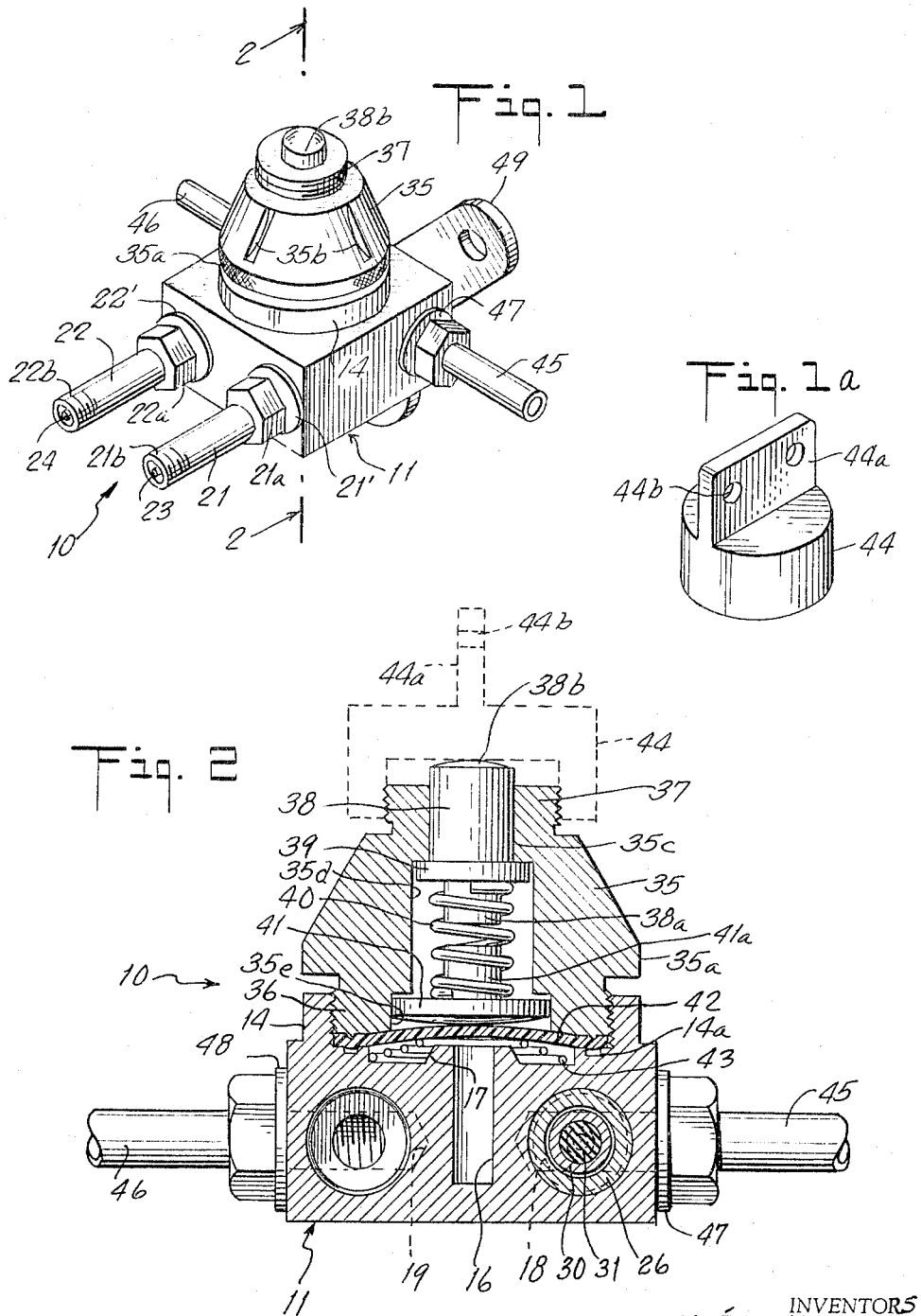
INVENTORS
JOSÉ ALVARADO
GERMAN DE MARIA Y CAMPOS FERNANDEZ
BY ROLF MATTIASSON
John J. Hart
Dayton R. Stemple Jr.
ATTORNEYS

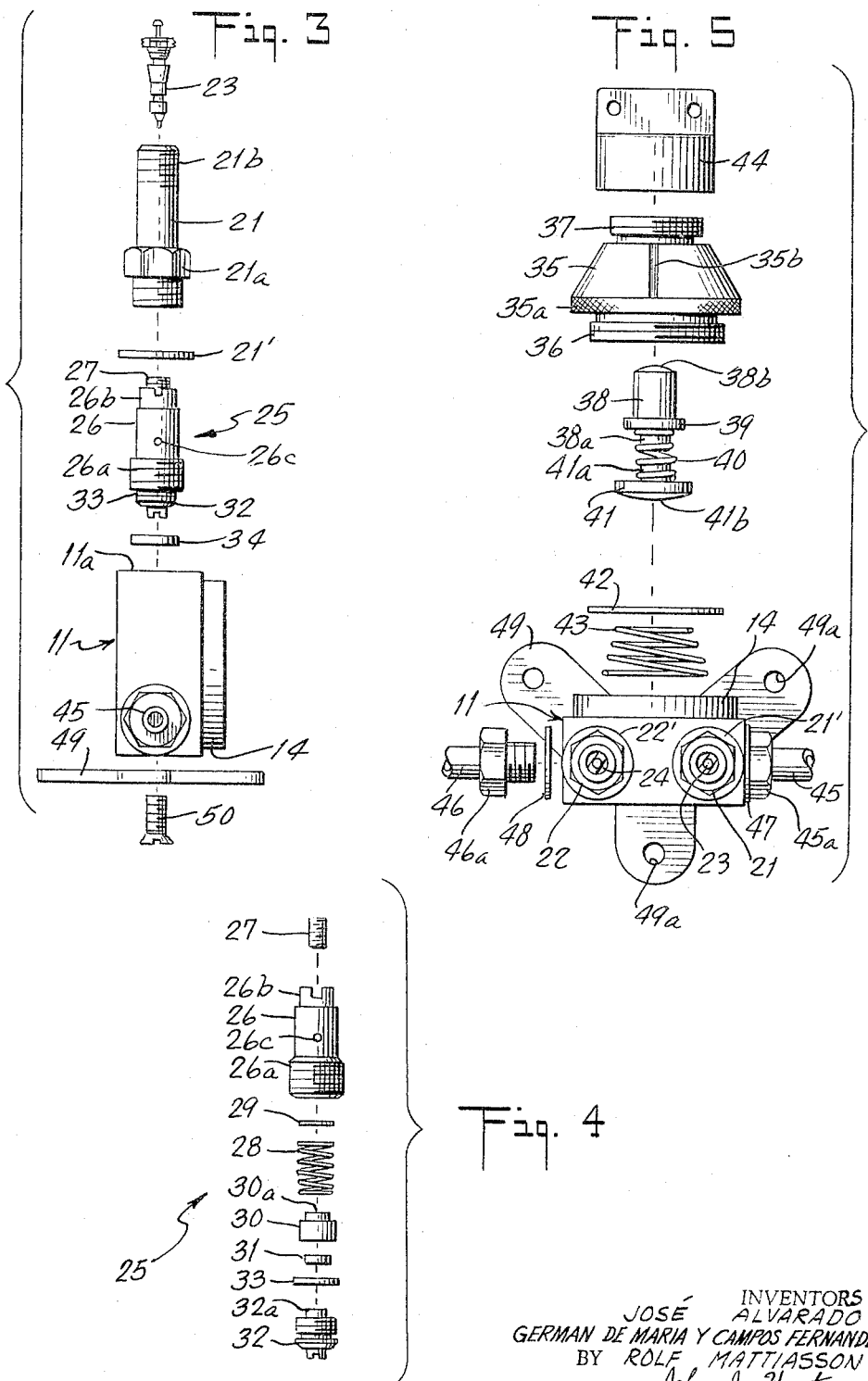

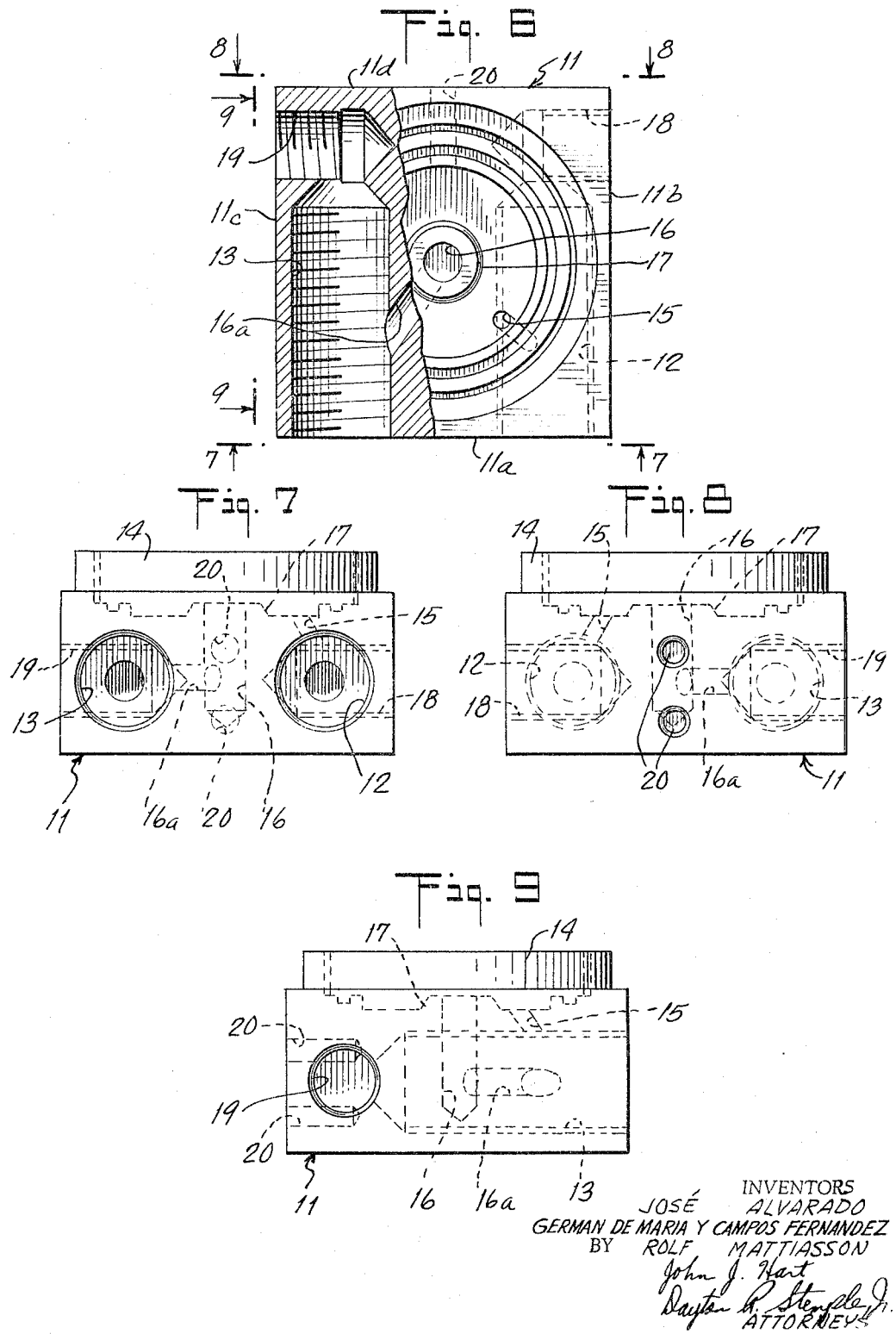

United States Patent Office 3,269,410
Patented August 30, 1966

3,269,410
STOPCOCK OR FLOW VALVE
Jose Alvarado, Sur 83, 430 Colonia Boturini, German de Maria y Campos Fernandez, Perseo 13, and Rolf Mattiasson, Calle Curie 10, all of Mexico City, Mexico
Filed Oct. 21, 1964, Ser. No. 405,561
1 Claim. (Cl. 137—612.1)

This application is a continuation-in-part of our prior copending application Serial No. 282,535, filed May 20, 1963, now abandoned.

This invention relates to uni-directional stopcocks or valves for gaseous fluids, and in particular to valves of the class commonly known as dual stem bypass valves which are used widely by the communications industry for pressure determinations in pressurized cables.

It is presently the general practice to protect telephone cables and the like against moisture by the injection of dry air, nitrogen or other inert gas under suitable pressure into the sheaths of the cables. In many instances, the air or gas is fed continuously into the cable system by means of a compressor-dehydrator or dryer located at the exchange central office. Continuity of the gas flow path despite the presence of hardened epoxy resin plugs or the like in the cable system at various points thereof is maintained by the provision of bypasses soldered into the cable sheathing. Bypasses are also provided at other, non-plugged portions of the cable system. Each bypass generally has incorporated therein a bypass valve which defines a part of the bypass flow path and can be closed when it is desired to block the bypass.

It will be readily understood that under ordinary conditions, i.e., in the absence of holes or other leaks in the cable sheath, the pressure within any given cable is substantially uniform at a value of at least about 8 to 10 p.s.i. above atmospheric. Should a leak occur, however, the cable pressure at that location begins to drop, resulting in a non-uniformity of the pressure distribution. Accordingly, especially in continuous feed pressurized cable systems, dual stem bypass valves are most advantageously employed in those locations where measurements of the pressure conditions existing in the adjacent portions of the cable system are or may have to be taken, inasmuch as these valves permit pressure measurements on both their upstream and downstream sides and thus are highly suited for use as the means for locating and isolating leaks in the cable sheath.

A conventionally dual stem bypass valve generally comprises a permanently sealed housing within which is arranged a stainless steel diaphragm valve assembly adapted to be seated against a port in the fluid passageway of the housing. Spring means bias the diaphragm in a direction away from the port and against one end of a control screw. When this control screw is rotated in one direction, it recedes from the port, permitting the diaphragm to leave its seat and open the valve, while when the control screw is turned the other way, it is advanced toward the port and presses the diaphragm against its seat to close the valve. In addition, two tubes integrally built into the housing extend from the latter for connection to the cable sheath, and two valve stems (similar to those used in tire valves) are connected to the housing and communicate with the fluid passageway on opposite sides of the diaphragm valve assembly to permit a selective connection of a manometer or other type of pressure gauge to the bypass valve.

In ordinary use, when a pressure measurement is to be made, the control screw is closed, whereupon a gauge is sequentially connected to the two valve stems. The respective readings then indicate whether or not the cable pressures upstream and downstream of the valve are at the prescribed levels.

The use of these standard bypass valves is, however, attended by a number of disadvantages. Very frequently, a workman after completing a pressure measurement or leak repair job will inadvertently forget to turn the control screw back to its "open" position, thereby leaving the portion of the cable downstream of the valve permanently isolated from the gas feed source. Also, with the valve normally open, should a leak occur upstream of the valve, i.e. between the valve and the feed source, the portion of the cable downstream of the leak and the valve will also lose its protection; in fact, the cable pressure decrease in the direction of the leak downstream thereof is found to be much more pronounced than on the upstream side. Still further, the permanent connection of the bypass tubes to the valve housing causes the valve parts to be subjected to high temperatures when the tubes are soldered to the cable sheath or to an associated lead pipe or sleeve, which gives rise to the possibility of some of these parts being damaged by heat.

It is an object of the present invention, therefore, to provide dual stem bypass valves for pressurized electrical cable protection which are free of the disadvantages and drawbacks of known valves of the same type.

Another and very important object of the present invention is the provision of a dual stem bypass valve construction which permits fluid flow therethrough in only one direction.

It is also an important object of the present invention to provide a dual stem bypass valve construction in which the diaphragm valve assembly is arranged for yielding movement to its closed state and is automatically returned to its open state as soon as the force tending to close it is released.

Still another object of the present invention is the provision of auxiliary means for selectively locking the diaphragm valve assembly of such an automatically opening dual stem bypass valve in its closed state.

A further object of the present invention is the provision of a dual stem bypass valve construction as aforesaid which can be readily assembled and disassembled, is extremely easy to install or remove, and can be employed in both underground and aerial cable systems and under both low and high ambient temperature and pressure conditions.

The foregoing and other objects, characteristics and advantages of the present invention will be more clearly understood from the following detailed description thereof when read in conjunction with the accompanying drawings, in which:

FIG. 1 is a perspective elevational view of a dual stem bypass valve according to the present invention;

FIG. 1a is a perspective elevational view of an auxiliary element adapted to be used with the valve of FIG. 1 for locking the same in its closed condition;

FIG. 2 is a sectional view taken along the line 2—2 in FIG. 1;

FIG. 3 is an exploded side elevational view of the valve, showing details of the valve stem and unidirectional flow means according to the present invention, the diaphragm valve assembly being omitted;

FIG. 4 is an exploded elevational view of the unidirectional flow means;

FIG. 5 is a partly exploded front elevational view of the valve, showing details of the diaphragm valve assembly;

FIG. 6 is a top plan view, partly broken away, of the body or housing of the valve shown in FIGS. 1 and 2; and FIGS. 7, 8 and 9 are, respectively, front, rear and side elevational view of the said housing taken along the lines 7—7, 8—8 and 9—9 in FIG. 6.

Referring now to the drawings in greater detail, it will be seen that the dual stem bypass valve 10 according to the present invention comprises a housing defined by an essentially rectangular block or body 11 (FIGS. 6 to 9) made of latten, brass, stainless steel or any other suitable metallic or non-metallic material. The block 11 is provided with a pair of internally threaded ducts or bores 12 and 13 which open at the front face 11a of the block and extend rearwardly therefrom through a major portion of the block adjacent the opposite sides of the latter. Projecting upwardly from the top surface of the block is an internally threaded bushing. 14. The interior space of the bushing 14 is in communication with the bore 12 at an intermediate point of the latter by means of a short, frontwardly and downwardly angled duct 15, and with the bore 13 at an intermediate point thereof by means of a vertical central bore 16 and a short, horizontal and frontwardly angled duct 16a which communicates with the bore 16 near the bottom thereof. The uppermost end of the bore 16 is surrounded by a relatively small, upstanding and flat-topped ridge 17 defining a port and valve seat, as will be more fully explained presently.

The block 11 is also provided with a pair of lateral, internally threaded bores 18 and 19 which, in the illustrated form of the invention, extend substantially in axial alignment with one another inwardly from the opposed side faces 11b and 11c of the block adjacent the rear face 11d thereof and are in communication adjacent their innermost ends with the innermost or rearwardmost ends of the bores 12 and 13, respectively. In its rear face 11d, the block 11 is further provided with a pair of relatively short tapped or internally threaded bores 20.

Screwed into the bores 12 and 13 of the block 11 are two short pipes 21 and 22, suitable washers 21' and 22' being interposed between the bolt heads 21a and 21b of these pipes and the adjacent block face 11a. Positioned in these pipes are two normally closed, plunger-type valves 23 and 24. The pipe and valve combinations 21–23 and 22–24 thus constitute a pair of valve stems (similar to tire valves). The outermost ends of the pipes 21 and 22 are externally threaded, as shown at 21b and 22b, to enable a pressure gauge (not shown) to be selectively connected to the valve stems.

Associated with the housing 11 of the valve 10 is a small uni-directional flow capsule 25 the purpose, manner of use and operation of which will become clear as the description proceeds. As clearly shown in FIGS. 3 and 4, the capsule 25 comprises a short tubular housing 26 which is externally threaded at one end 26a and has a reduced-diameter section 26b at its other end. The capsule housing 26 is provided with an axial through-bore (not shown) into the outermost end of which (the end at the reduced diameter section 26b) is threaded an axially bored adjusting screw 27. Substantially at its midpoint, the housing 26 is provided with a plurality of radial openings 26c which are in communication with the central bore of the housing. Seated within this bore is a spring 28 one end of which bears against a perforated plate 29 and the other end of which seats against a shoulder of a small, hollow, cup-shaped element 30, which is closed at its reduced diameter end 30a and fits loosely into the bore of the housing 26. A small imperforate rubber packing element 31 is tightly received within the element 30. The latter is retained within the bore of the housing 26 by an axially bored inlet plug 32 which is screwed into the housing over a washer 33 and has an axial tubular extension 32a adapted to engage the rubber packing 31 in the element 30. The spring 28 thus serves to press the packing element 31 against the inlet plug extension 32a with a force which depends on and can be varied by corresponding adjustment of the screw 27.

It will be apparent, therefore, that air can flow through the capsule 25 only in one direction, from the inlet plug 32 toward the adjusting screw 27. Air so entering the capsule unseats the rubber packing 31 from the extension 32a against the force of the spring 28 and flows around the cup-shaped element 30, leaving the housing 26 via the screw 27 and the openings 26c. Air entering the housing either through this screw or the openings 26c cannot flow in the opposite direction, however, since the spring 28 and the pressure of the air now both force the packing 30 against and into tight sealing relationship with the extension 32a.

The capsule 25 is adapted to be screwed selectively into the bores 12 and 13 by means of its externally threaded section 26a, and its length is such that when the inlet plug 32 is disposed at the innermost end of the respective bore 12 or 13, the reduced diameter section 26b of the housing 26 is disposed in the outermost end region of the said bore and within the threaded end of the associated valve stem 21–23 or 22–24 screwed into that bore. If desired, a washer 34 may be interposed between the inlet end of the capsule 25 and the innermost end of the bore 12 or 13.

Referring now to FIGS. 1, 2 and 5, an axially bored cap-shaped retaining member 35 having an externally threaded extension 36 at one end and a second externally threaded extension 37 at the other is secured to the block 11 by screwing the extension 36 into the bushing 14. Advantageously, the member 35 has a knurled rim 35a and a plurality of wrench-receiving slots 35b to facilitate adjustment of the member. Slidably received in a portion 35c of the axial bore of the member 35 is a small plunger 38 having an enlarged shoulder 39 received in an enlarged portion 35d of the bore. A reduced width projection 38a of the plunger 38 extends partly through the bore portion 35d and is yieldingly coupled by a spring 40 to a reduced width projection 41a of a rounded enlarged pressure foot 41 received in another enlarged portion 35e of the bore in the member 35. The rounded face 41b of the pressure foot bears against the center of a flexible metallic or synthetic plastic diaphragm 42 which is confined along its perimeter between the end face of the extension 36 and an opposed shoulder 14a defined at the bottom of the space within the bushing 14. The central part of the diaphragm 42 which overlies the ridge 17 is biased away therefrom by one end of a spring or like resilient element 43 the other end of which is seated against the top surface of the block 11 within the confines of the bushing 14 and in surrounding relationship to the port-defining ridge 17.

As clearly shown in FIG. 2, when the parts 35 to 43 are assembled with the block 11 in the manner described, the spring 43 maintains the diahphragm 42 in the illustrated position and causes the plunger 38 to project to the maximum possible extent from the retaining member 35. The plunger thus constitutes a button by means of which the entire plunger assembly 38–41 and the contiguous diaphragm 42 can be depressed against the force of the spring 43. Upon application of pressure to the plunger end or button 38b, the diaphragm is seated against the port or ridge 17, thereby to interrupt the communication between the bore 16 and the interior space of the bushing 14. It will be understood that releasing the button 38b automatically opens the valve assembly 17–42. Thus, except in the manner to be presently described, the bypass valve 10 of this invention cannot be left permanently in a closed condition. Further reference to this aspect of the invention will be had hereinafter.

In accordance with the present invention, an auxiliary tool is provided to permit the valve 10 to be locked in its closed condition whenever this is desired and/or necessary. Such a tool, shown in phantom outline in FIG. 2, preferably comprises an internally threaded cap 44 (see also FIGS. 1a and 5) which can be screwed onto the extension 37 and has an operating handle 44a in which at least one opening 44b is provided. The interior depth of the cap 44 is such that when it is substantially fully screwed onto the extension 37, the plunger assembly 38–

41 is fully depressed and is held there. The diaphragm valve assembly thus is locked in its closed state as long as the cap 44 remains in its fully screwed on position.

Screwed into the bores 18 and 19, respectively, are two short tubes or pipes 45 and 46, suitable washers 47 and 48 being interposed between the bolt heads 45a and 46a of these pipes and the adjacent sides faces 11b and 11c of the block 11. The pipes 45 and 46 are adapted to be connected with the interior of a telephone cable sheath so that the entire valve 10 defines a part of the bypass air flow path for the cable at that location. A suitably shaped mounting plate 49 having holes 49a formed therein is affixed to the rear face 11d of the block by means of screws or bolts 50 threaded into the bores 20.

To install the dual stem bypass valve 10 according to the present invention, the pipes 45 and 46 are first soldered to the cable sheath or associated lead sleeves or pipes and are then screwed tightly into the ports defined by the outer ends of the bores 18 and 19 in the block or housing 11. The advantage of this procedure thus is that the soldering can be effected without subjecting the sensitive valve elements and packings to unduly high heat which might have a deleterious effect on them. The uni-directional capsule 25 is most advantageously screwed into that one of the bores 12 and 13 which is located on the intake or upstream side of the diaphragm valve assembly. Thus, assuming the pipe 45 to be connected to that portion of the cable leading to the air feed source, i.e. the compressor dehydrator, the capsule 25 is inserted in the bore 12. After the valve stems 21–23 and 22–24 have been screwed into the ports defined by the outer ends of the bores 12 and 13, respectively, the valve stem thus overlying the outermost end of the capsule 25, the mounting plate 49 is secured to any suitable support. The valve is now ready for use.

In operation, the dry gas or air fed into the upstream portion of the cable enters the valve 10 through the pipe 45 and flows thence through the bore 18 into the inlet plug 32 of the uni-directional capsule 25. A part of this air leaves the capsule via the adjusting screw 27, from where it can enter a pressure gauge (not shown) when the latter is connected to the pipe 21 in such a manner as to open the valve 23. The remainder of the gas or air entering the bore 12 flows therefrom through the duct 15 to the space within the bushing 14. With the button 38b not depressed, i.e. in its most protracted position, the air or gas flows through the bore 16 and duct 16a into the bore 13 and thence to the discharge pipe 46.

When it is desired to check the telephone cable on the upstream side of the valve 10, a pressure gauge is connected to the pipe 21 and the button 38b is manually depressed. With the communication between the bores 12 and 13 thus interrupted, the reading will reflect the pressure conditions existing in the portion of the cable upstream of the valve. To check the cable on the downstream side of the valve, the same procedure is followed except that prior to depressing the button 38b the pressure guage is connected to the pipe 22. In either case, of course, the diaphragm valve 17–42 is closed only temporarily, since as soon as the button is released, the spring 43 returns it and the diaphragm 42 to their normal positions, whereupon the air or gas can again flow uninterruptedly through the entire length of the cable. Since operating instructions to the workmen will specify that the cap 44 is never to be on the valve except during repairs, the present invention effectively eliminates the possibility of the valve 10 being left unintentionally in its closed state.

If the existence of a leak is discovered, for example on the downstream side of the bypass valve 10 by an abnormally low pressure reading on the guage connected with the pipe 22, the cap 44, which normally hangs inactive nearby with the aid of a wire passed through the hole 44b, is screwed to its full extent onto the extension 37 of the retaining member 35 to depress the button 38b and thus to hold the plunger assembly continuously in its diaphragm valve-closing position. In this manner, the loss of pressure from the upstream side of the cable is avoided while the neecssary repairs are being made. As soon as this has been done, the cap 44 is again unscrewed to permit the plunger assembly to be once more moved away from its valve-closing position.

The major advantage accruing from the presence of the one-way capsule 25, of course, is that if a cable leak should occur on the upstream side of the valve 10, the pressurized air previously fed into the downstream portion of the cable is not lost, as it cannot flow back through the capsule toward the region of lowered pressure.

It will be understood that the foregoing description is intended for purposes of illustration only, and that the various structural details, features and relationships disclosed may be altered in a number of ways. Thus, although the various connections between the separable elements of the valve 10 are all shown as being threaded, they may equally well be effected by other types of locking means, for example pin and slot connections or the like. Also, although the various elements of the device are preferably made of a corrosion-resistant metal, they may be made of suitable non-metallic materials such as synthetic resins or like plastics. As previously indicated, the spring 43 may be in the form of a differently shaped resilient element which need not be made of metal, the only requirement being that it exert a sufficient amount of force on the diaphragm to separate the same from the ridge 17 when the force holding the plunger assembly 38–41 down is released. Likewise, the various bores and ducts need not be arranged in the precise orientations shown and described, as long as the path of flow of air through the valve and the manner of interrupting such flow are established in accordance with the principles of the present invention. The bypass valve may, of course, be used with other types of cables than telephone cables, for example telegraph and teletype cables, electric power cables, etc.

Having thus described our invention, what we claim and desire to secure by Letters Patent is:

A device for use in checking fluid pressure conditions in a conduit, comprising a housing adapted to be connected into said conduit and provided with a first port and a second port extending into communication therewith, said housing defining a continuous flow path for the fluid between said first and second ports, and including a hollow space and a first pair of separate passageways respectively connecting said first and second ports therewith and a second pair of separate passageways respectively extending from each of said first pair of passageways into communication with the outside of said housing, a normally-open diaphragm valve associated with said hollow space for shutting off fluid flow therethrough and through the passageway connected to said second port, resilient means engageable with one face of the diaphragm of said valve for maintaining the diaphragm in its normally open position, a member covering the other face of said diaphragm and being provided with a two-part telescoping plunger having one part engaged with the associated face of said diaphragm and another part projecting through said member and extending therebeyond, resilient means positioned within said member for biasing apart the two parts of said plunger, means for limiting the action of said resilient biasing means, each of the said second pair of passageways being provided with means to permit fluid flow therethrough only in a direction from the said first pair of passageways toward the outside of said housing and being provided adjacent its outer end with a normally-closed stem-operated pressure gauge connecting valve, and a locking element releasably connectable with said diaphragm-covering member at the exterior of the latter for engagement with the projecting end of said plunger for reciprocating said plunger against the resistance of said resilient maintaining and biasing means and to flex the diaphragm of said normally-open valve into its closed position.

References Cited by the Examiner
UNITED STATES PATENTS

| | | | |
|---|---|---|---|
| 1,62,834 | 12/1915 | Watrous | 251—321 X |
| 2,277,395 | 3/1942 | Franck | 251—331 X |
| 2,320,456 | 6/1943 | Frazer-Nash | 137—557 X |
| 2,582,259 | 1/1952 | Koplin et al. | 137—614.2 |
| 2,595,156 | 4/1952 | Matasovic | 73—389 |

WILLIAM F. O'DEA, *Primary Examiner.*

ISADOR WEIL, *Examiner.*

DAVID J. ZOBKIW, *Assistant Examiner.*